(12) United States Patent
Stukenberg et al.

(10) Patent No.: US 10,920,854 B2
(45) Date of Patent: Feb. 16, 2021

(54) KENTER SHACKLE

(71) Applicant: SCHMIEDESTUECK-VERTRIEB FEUERSTEIN GmbH, Hattingen (DE)

(72) Inventors: Till Stukenberg, Bochum (DE); Nina Sverdlova, Castrop Rauxel (DE)

(73) Assignee: SCHMIEDESTUECK-VERTRIEB FEUERSTEIN GMBH

( * ) Notice: Subject to any disclaimer, the term of this patent is extended or adjusted under 35 U.S.C. 154(b) by 0 days.

(21) Appl. No.: 16/092,535

(22) PCT Filed: Apr. 28, 2017

(86) PCT No.: PCT/DE2017/100360
§ 371 (c)(1),
(2) Date: Oct. 10, 2018

(87) PCT Pub. No.: WO2017/186237
PCT Pub. Date: Nov. 2, 2017

(65) Prior Publication Data
US 2019/0120326 A1 Apr. 25, 2019

(30) Foreign Application Priority Data
Apr. 29, 2016 (DE) .................... 10 2016 108 050

(51) Int. Cl.
*F16G 15/04* (2006.01)
*F16G 15/02* (2006.01)
(Continued)

(52) U.S. Cl.
CPC ............. *F16G 15/04* (2013.01); *F16G 15/02* (2013.01); *F16G 13/14* (2013.01); *F16G 15/10* (2013.01)

(58) Field of Classification Search
CPC .......... F16G 15/00; F16G 15/02; F16G 15/04; F16G 15/06; F16G 15/10; F16G 15/12;
(Continued)

(56) References Cited

U.S. PATENT DOCUMENTS

| 6,216,434 | B1 * | 4/2001 | Dalferth | F16G 15/02 |
| | | | | 59/85 |
| 8,056,315 | B2 * | 11/2011 | Mulle | F16G 15/02 |
| | | | | 59/85 |
| 8,087,227 | B2 * | 1/2012 | Feuerstein | F16G 15/02 |
| | | | | 59/86 |

FOREIGN PATENT DOCUMENTS

| DE | 3710047 A1 * | 10/1988 | ............. F16G 15/02 |
| DE | 3916284 A1 | 5/1989 | |
| DE | 102009050078 A1 | 10/2009 | |

OTHER PUBLICATIONS

International Search Report of Corresponding International Application No. PCT/DE2016/100359, Filed Apr. 28, 2017.

* cited by examiner

*Primary Examiner* — Pradeep C Battula
(74) *Attorney, Agent, or Firm* — Head, Johnson, Kachigian & Wilkinson, PC

(57) ABSTRACT

The Invention relates to a Kenter shackle for anchor chains, at least comprising two half elements which can be coupled to one another and a coupling piece element that can be introduced between the half-elements wherein the half elements each have an L-shaped or J-shaped configuration, wherein the external toothing having a plurality of parallel toothing planes is formed at the end of a short connection leg and wherein a receiving chamber is formed at the end of a long connection leg, having an internal toothing with a plurality of parallel toothing planes, into which the external toothing of the short connection leg engages, and wherein (Continued)

the connection legs are connected to one another via a curved clasp. In addition, the receiving chamber in the long leg is extended by means of a cavity above the end side of the external toothing of the short leg and/or above the uppermost toothing plane of the internal toothing pointing towards the clasp.

10 Claims, 5 Drawing Sheets

(51) Int. Cl.
    *F16G 15/10*     (2006.01)
    *F16G 13/14*     (2006.01)

(58) Field of Classification Search
    CPC .......... F16G 15/14; F16G 13/12; F16G 13/14; B21L 9/08
    USPC ..................................... 59/78, 84, 85, 86, 93
    See application file for complete search history.

KENTER SHACKLE

BACKGROUND OF THE INVENTION

The invention relates to a Kenter shackle according to claim 1.

With the chain link shown in DE 199 01 233 A1, the teeth of the half elements engage with each other such that only they are positively locked against tensile forces in the main load direction, but not transversely to it. The toothing is only effective one-dimensionally and not spatially. By aligning the center lines of the interlocking teeth obliquely to the center axis, the outer legs of the half elements can manage with only a relatively small reduction in wall thickness towards each end.

A Kenter shackle, as known from the U.S. Pat. No. 8,087,227B2, for example, is a connector element consisting of at least two parts. It is used to subsequently connect two pieces of an anchor chain to each other and to be able to disconnect the connection again later, or to connect another part, in particular, the anchor itself, to an anchor chain. If the Kenter shackle is used as an anchor chain connector element, it must be symmetrical so that it runs through chain guides and fits into the chain sprocket of the anchor winch just like the individual links of the anchor chain.

At the end of the chain, however, a different type of Kenter shackle may be provided, consisting of two different halves, wherein one half is also rounded like an anchor shackle, for example, and the other half is V-shaped, in order to affect centering, for example, of an anchor chain link hooked into it. Irrespective of the function and outer contour, the half elements of the Kenter shackle have the same form in the area of the connection. As half elements, two walking stick-like elements are provided, which can be pushed into each other laterally and feature toothing or interlocking receptacles. The shorter end of the walking stick- or J-shaped half element must end at the center plane so that the half elements can be pushed into each other laterally past each other. On the longer part of the half element, there are several teeth one above the other in parallel planes. In the side view, these have the shape of a sawtooth toothing. The teeth are arranged on at least two opposite sides. Preferably, they are formed on three sides. In the side view, the entire group of toothings is slightly wedge-shaped, i.e. the width decreases from plane to plane. Different zones are stressed through this staggered arrangement.

The disadvantage of the well-known chain connector is that the toothing is relatively sharp-edged so that high notch stresses occur in the transitions between the planes and towards the remaining half element. It is not possible to strengthen the weakened areas by simply increasing the wall thickness because the outer shape of the Kenter shackle must not be changed significantly since compatibility with the anchor chain links must be maintained. The assembled half elements must be identical to the anchor chain links in terms of both the shape and size of the outer circumference and the shape and size of the inner bays into which the adjacent anchor chain links engage.

This objective, as well as other objectives which will become apparent from the discussion that follows is achieved, according to the present invention, by increasing the strength of the Kenter shackle and to avoid fatigue fractures in the notched transition zones.

The empty space is provided in the half element above the toothing at the top in the direction of the load, which is designed either as a groove running around above the toothing or as a pocket recessed over the entire surface. The outer circumference of the groove or pocket is also rounded with a large radius. In this way, the tensile stresses are held longer in the outer circumferential area of the leg or transferred around the toothing receptacle to the adjoining arc area on the half element.

Furthermore, according to the invention, all tooth flanks are rounded with a large radius, both at the transition on the outside and at the internal grooves.

The radius of curvature of the flanks and grooves on the toothing is at least 3% of the nominal core diameter, e.g., R3 for D=76. The diameter of curvature at the transition to the receiving space is then even larger.

As soon as the half elements are connected, a so-called coupling piece is inserted between them. It divides the oval formed by the half elements inserted into each other into an eight and also prevents the half elements pushed into each other laterally from drifting apart again. It also braces the half elements against each other when the Kenter shackle is under load, reducing deformation in the oval.

The coupling piece is as already known held and secured by a grooved pin which is driven into a bore which runs diagonally through the entire unit consisting of the connected half elements and the coupling piece inserted between them.

In a preferred embodiment, a specially designed coupling piece is provided, which can be fastened without the long notched pin, so that, in particular, the bores in the half elements are significantly reduced in length and no longer extend into the outer zones next to the toothing receptacle, which have to absorb all tensile stresses. The points of weakness in the half elements, which are formed by the bore in conventional fastening, are thus eliminated in this preferred embodiment.

The improved coupling piece provides two bolts in one transverse bore, which can be pushed outwards via a central spreader element. In this way, the ends of the bolts, which are in particular hemispherically rounded or also conically or cylindrically shaped, protrude from the base body of the coupling element and can engage in corresponding receptacles on the inner flanks of the half elements. Lateral stop surfaces, which interact with corresponding protrusions or recesses on the inner flanks of the half elements, prevent the coupling piece from rotating around the bolt axis. Dismantling the Kenter shackle is much easier with this preferred embodiment, including under water using a diving robot. Only the hexagon socket screw on the coupling piece, which is preferably used as a spreader element, has to be loosened so that the two bolts can be pushed back in again. Due to the preferably spherical or conical shape of the ends of the bolts, they are automatically pushed back when the coupling piece is pulled out of the Kenter shackle. If this is not possible due to advanced corrosion, the coupling piece can be cut in the middle, leaving the half chain elements undamaged.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
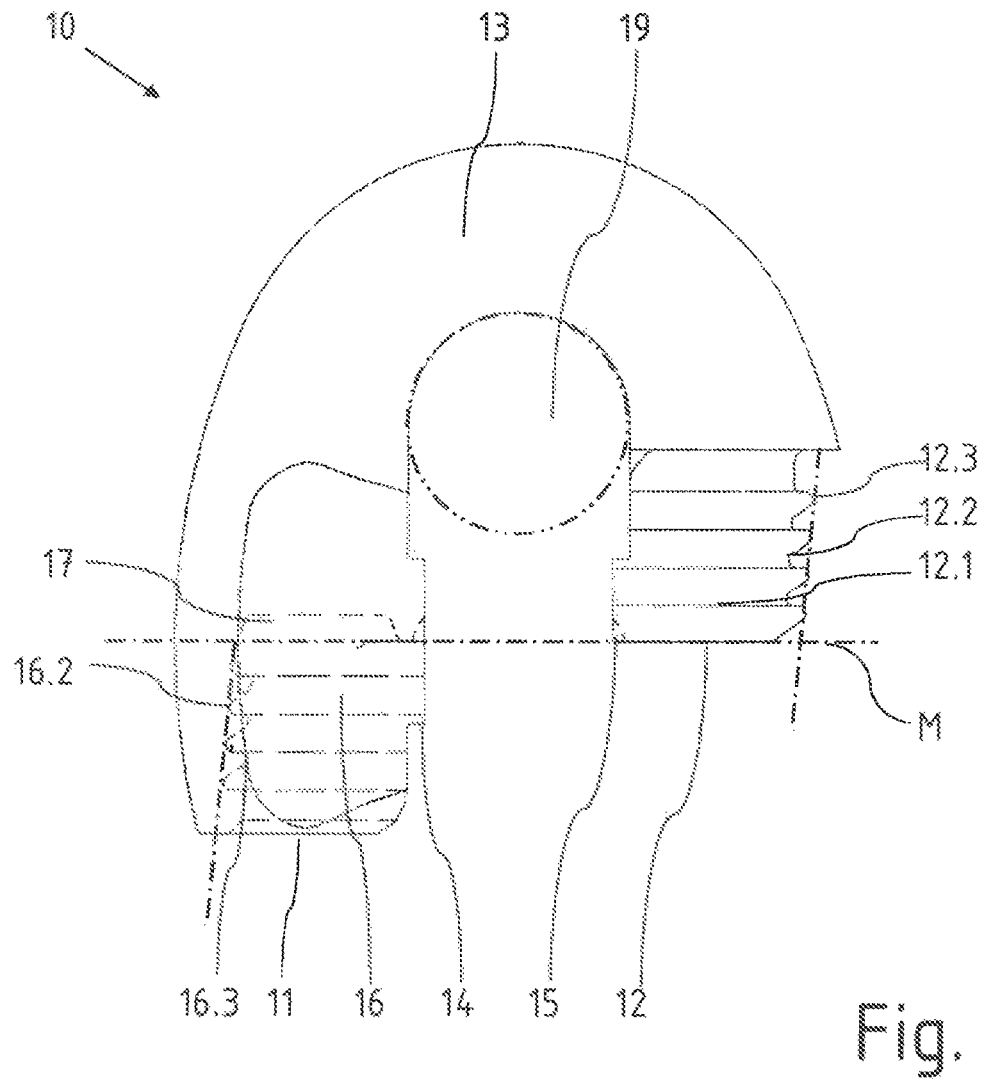
FIG. 1 is a half in a side view.

The preferred embodiments of the present invention will now be described with reference to FIGS. 1-5 of the drawings. Identical elements in the various figures are designated with the same reference numerals.

FIG. 1 shows a single half element 10 for a Kenter shackle in side view. The half element 10 essentially consists of a short leg 12 and a long leg 11, whereby the legs 11, 12 are connected to each other by a bent clasp 13.

As the side view in FIG. 1 further shows, the short leg 12 has an external toothing 12.1. An internal toothing 16.1 begins on the opposite long leg 11 at the level of the lower end of the short leg 12, which is formed in a hollow space 16 on the long leg 11. The transverse dashed-dotted line marks the center plane M and indicates the distinction between the cavity 16 with internal toothing 16.1 and a cavity 17 formed above the toothing area 16.1. Protrusions 14, 15 are visible on the sides of the legs 11, 12 pointing towards each other, whereby the height of the protrusion 14 is exactly double the height of the protrusion 15 on the short leg 12.

The clasp 13, in particular, has a diameter that corresponds to the anchor chain to be connected. An eye 19 is formed inside the clasp 13, which is suitable for holding an anchor chain link.

The side view in FIG. 1 shows clear roundings on the pointed outer tooth flanks 12.3 of the sawtooth thread and the internal grooves 12.2, especially in the case of external toothing 12.1. The counterpart, the internal toothing 16.1 in the cavity 16 of the long leg 11, is rounded in the same manner. Due to the clear roundings, stress peaks in the outer tip area of the tooth flanks 12.3 are avoided, but in particular also at the tooth flank tips 16.1 and grooves 16.2 at the internal toothing. Because the end of the long shackle is already weakened by the large volume of the receiving space 16.

In order to be able to generously form the corresponding curves at the tooth flank tips 12.3, 16.3 and the grooves 12.2, 16.2, a certain distance between the parallel superimposed toothing planes is required. On the other hand, the length range available for toothings 12.1, 16.1 is limited at the half element 10, since the toothing can only begin at the point where the leg 12 emerges straight from the clasp 13 and must end exactly at the center axis.

The total length of a Kenter shackle composed of two half elements 10 is determined by the geometry of the adjacent anchor chain and therefore cannot be extended at will. According to the usual dimensions of anchor chains and by forming a radius of curvature of at least 3% of the nominal diameter, the formation of exactly four superimposed toothing planes is particularly advantageous.

Figure 2:
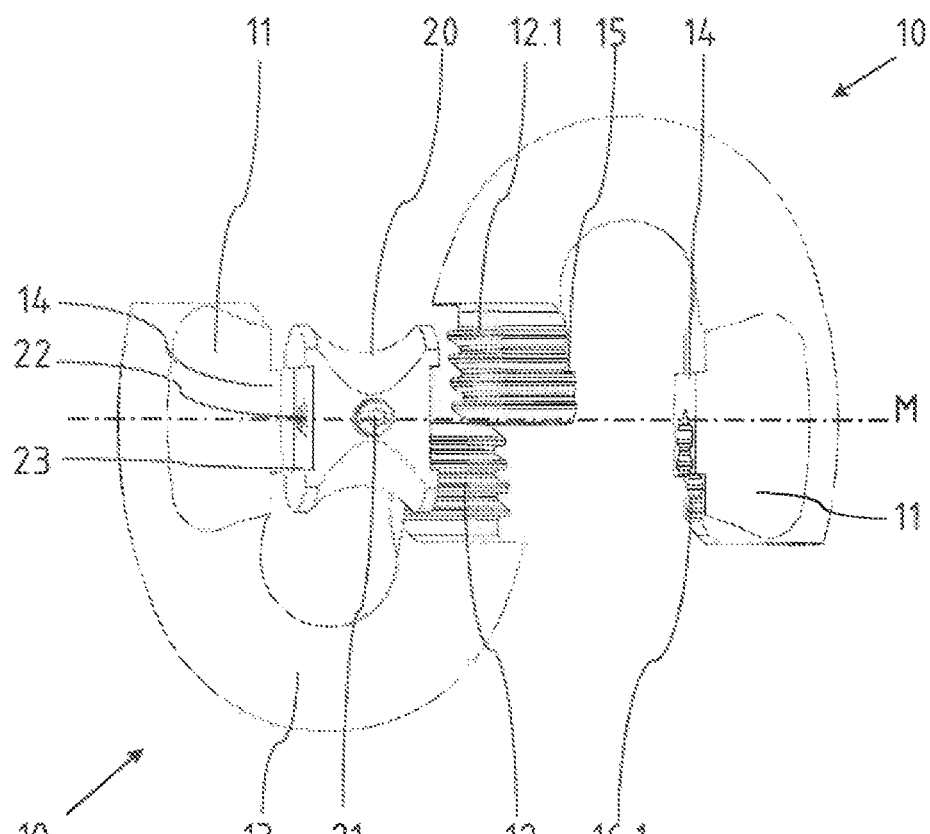
FIGS. 2 and 3 are individual parts of a Kenter shackle before assembly, each in perspective view.

FIG. 2 shows two identical half elements 10 in the correct position for assembly as shown in FIG. 1. The half elements 10 must be positioned such that the end faces of the short legs 12 abut each other in the center plane. The half elements 10 are connected by sliding them in laterally so that the toothing engages on both sides. The area of the short leg 12 provided with external toothing 12.1 is pushed into the cavity 16 with the internal toothing 16.1 on a long leg 11. The mounting direction is therefore exactly transverse to the load direction.

To secure to each other the two half elements 10 pushed into each other and also to enable support of the two legs 11, 12 under load, a so-called coupling piece element 20 is inserted centrally between the legs 11, 12. It has recesses 23 on the side surfaces, which are intended for contact with corresponding protrusions 14, 15 on the half elements 10. The positive guide over the edges of the protrusions and recesses 14, 15, 23 prevents twisting of the coupling piece element 20. The coupling piece element 20 is secured in the Z direction by a screw serving as spreader element 21 that can be used to push out laterally emerging bolts 22, which engage in recesses on the inner flanks of the half elements 10 inserted into each other.

Figure 3:
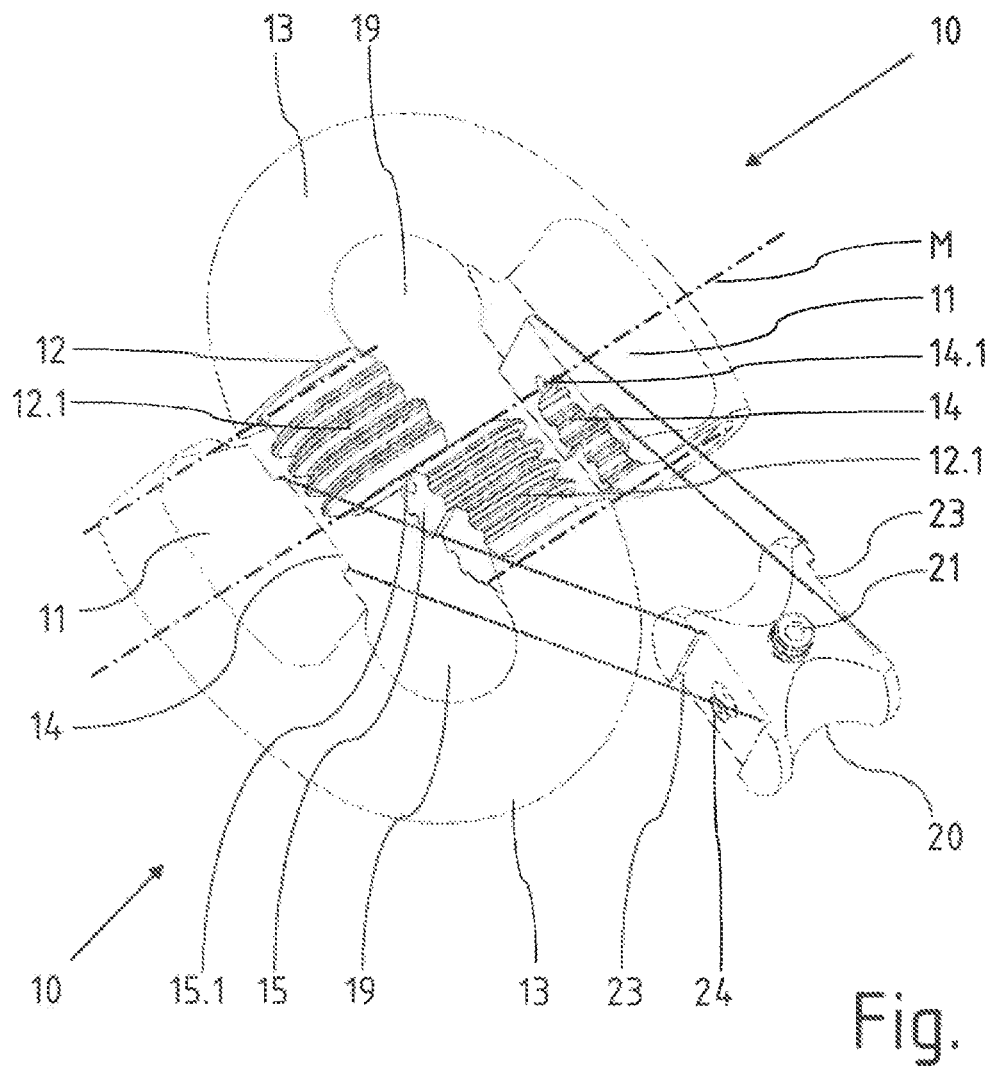

FIG. 3 shows the two half elements 10 and the coupling piece element 20 again in a somewhat different perspective. It can still be seen here that the inward facing surfaces of the short leg 12 do not have any toothing, as no engagement is possible with a counterpart on the respective long leg 11. However, a protrusion 15 is formed on the inside of the short leg 12 to fill and complete the protrusion 14 accordingly at the long leg 11 after the half elements 10 have been pushed into each other.

Figure 4:
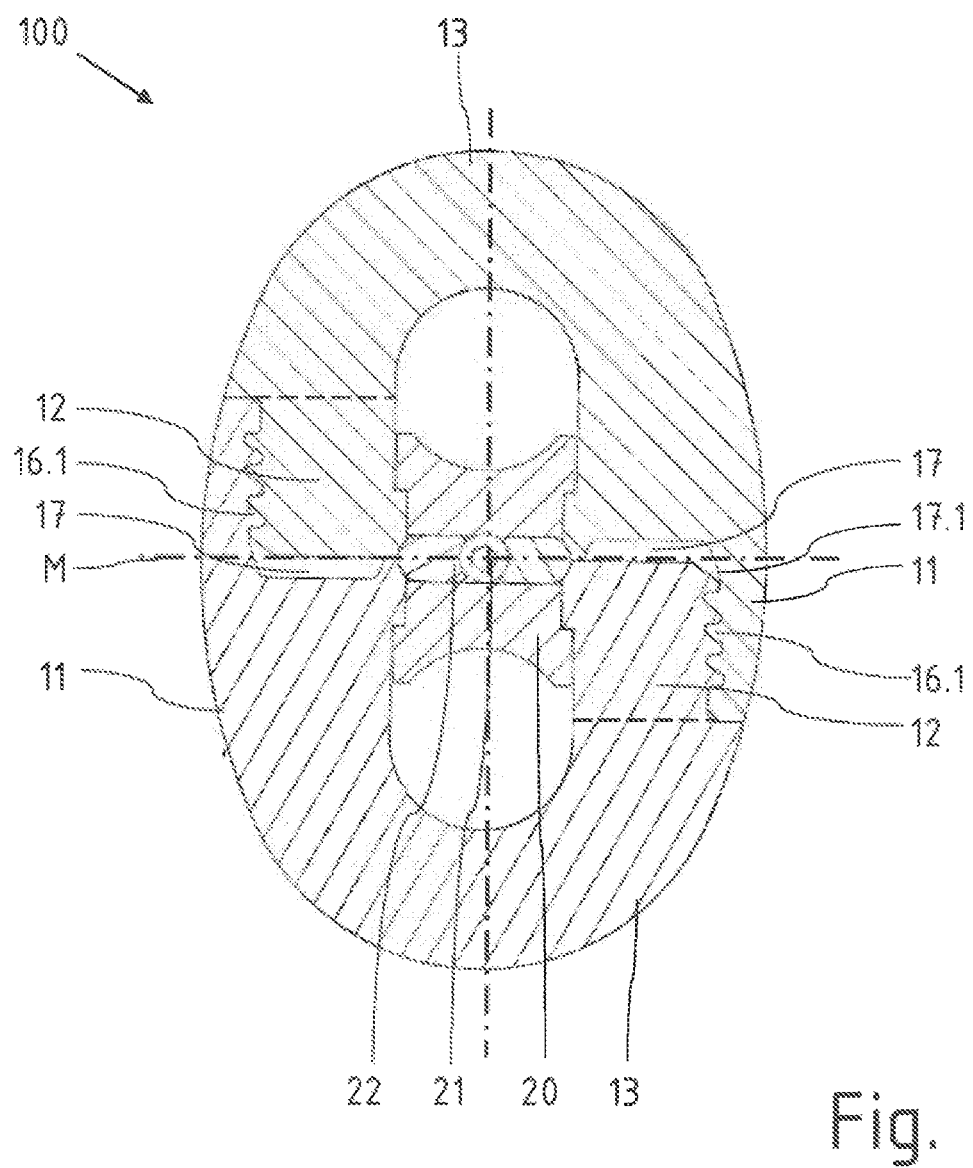
FIG. 4 is an assembled Kenter shackle in section.

FIG. 4 shows a fully assembled Kenter shackle 100 in a section. The toothing on the short leg 12 outside and on the inside of the receiving space 16 interlock completely. Above the outer toothing 12.1 on the short leg 12 however, the receiving space 16 expands into a cavity 17, which remains empty even with the fully assembled Kenter shackle 100. Preferably, the cavity 17 with a lateral flank 17.1 moves away from the last tooth tip 16.3 in the uppermost toothing plane roughly in the direction of the longitudinal axis of the Kenter shackle 100, i.e., parallel to the longitudinal axis or at an acute angle to it. With a further rounding, the lateral flank 17.1 of the cavity 17 merges into a roof area. With the Kenter shackle 100 under tension, the forces are transferred to the contact surfaces of the toothing, which are aligned transversely to the longitudinal axis. The arrangement of the cavity 17, which complements the actual receiving space 16 for receiving the toothing 12.1, the tensile stresses occurring under load are diverted much better. This avoids stress concentration selectively at points. Rather, the stresses are redirected past the cavity 17 into the initial region of the respective long leg 11 and from there into the bent clasp 13. According to one embodiment of the present invention, the cavity may have a height of at least 0.6 to 1.2 times the height of a toothing plane.

Figure 5:
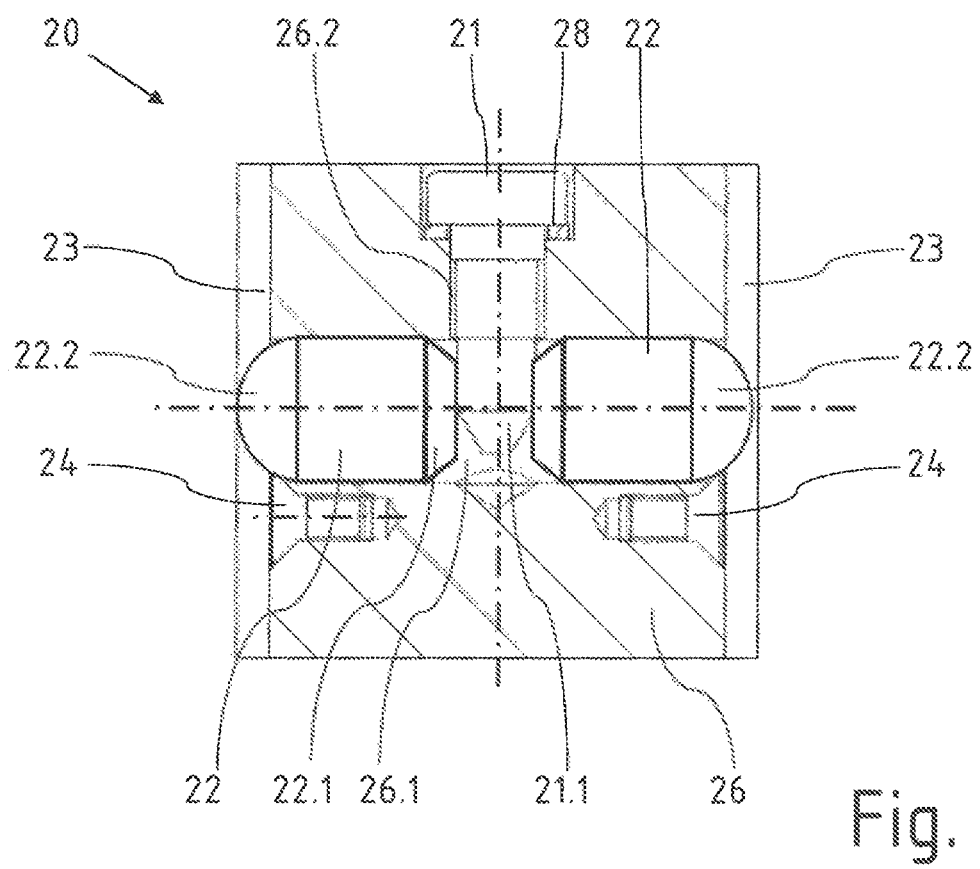
FIG. 5 is a coupling piece element in section.

FIG. 5 shows a cross-section through the coupling piece element 20. It has in a housing 26 a transverse bore 26.1 in which two locking bolts 22 are slidably arranged. These are rounded hemispherically at their outward facing ends 22.2. They are secured against falling out by screws 24. The two bolts 22 have a conical section 22.1 on the inner surfaces facing each other. A threaded bore 26.2 is formed perpendicular to the transverse bore 26.1, in which a spreader element 21 with a threaded shoulder is accommodated. This is a screw-like element that has a screw head that is accommodated in a countersink. A swing washer 28 can also be placed under the screw head.

The part of the spreader element 21 projecting into the transverse bore 26.1 is initially smooth and cylindrical, with a truncated cone tip at its end. By screwing the spreader element 21 into the housing of the coupling piece element 20, the tip 21.1 strikes the cone-shaped shoulders 22.1 of the bolts 22 and thus pushes them outwards. The rounded outer sides of the bolts 22 engage in bores formed on the inner flanks of the legs 11, 12. This fixes the coupling piece element 20 solidly between the two half elements 10. It blocks the half elements pushed into each other and keeps them at a distance under load so that no large deformations and associated increases in tensile stresses occur in the half elements 10.

The center axis of the bolts 22 is located exactly in the central plane M between the half elements 10, such that the receiving bore for the bolts 22 is also divided into two. As can be seen in FIG. 3, one half 14.1 of the bore is noticeable on the protrusion 14 on the inside of the long leg 11. Another half 15.1 of the bore is formed on the protrusion 15 of the short leg 12. When the half elements 10 are pushed together, a closed bore is created in which the bolts 22 or their rounded ends 22.2, respectively, can engage.

There has thus been shown and described a novel kenter shackle which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow

What is claimed is:

1. A Kenter shackle for anchor chains, said Kenter shackle having at least two half elements which can be coupled to one another and a coupling piece element that can be inserted between the half elements, said Kenter shackle comprising:
    said at least two half elements, each have an L-shaped or J-shaped configuration, in which external toothing with a plurality of parallel toothing planes, one above another, is formed at an end of a short connecting leg, and in which a receiving chamber is formed at an end of a long connecting leg, which receiving chamber has internal toothing having a plurality of parallel toothing planes, one above another, in which the external toothing of the short connecting leg engages, the connecting legs being connected to one another via a curved clasp;
    wherein the receiving chamber in the long leg is widened by at least one of:
        a shortening of the short leg thereby lowering an end face of the external toothing of the short leg; and
        a cavity above an uppermost toothing plane of the plurality of parallel toothing planes of the internal toothing facing the clasp; and
    wherein in the uppermost toothing plane of the plurality of parallel toothing planes, outer flanks of the internal toothing continue in the direction of the clasp and run out in a rounding on a roof of the cavity.

2. The Kenter shackle as in claim 1, wherein the cavity is formed by a groove extending at least above the tooth flanks of the uppermost toothing plane.

3. The Kenter shackle as in claim 1, wherein the cavity is formed by a pocket extending at least above the tooth flanks of the uppermost toothing plane.

4. The Kenter shackle as in claim 1, wherein the toothings at pointed transitions between the tooth flanks and in inner grooves are rounded with a radius of at least 3% of a nominal chain diameter.

5. The Kenter shackle as in claim 1, wherein the toothings each comprise four toothing planes.

6. The Kenter shackle as in claim 1, wherein the toothings are formed as sawtooth toothings and are aligned with a loading flank transversely or at an obtuse angle to a longitudinal axis oriented parallel to a length of the Kenter shackle.

7. A Kenter shackle for anchor chains, comprising at least two half elements which can be coupled to one another and a coupling piece element that can be inserted between the half elements;
    wherein the half elements each have an L-shaped or J-shaped configuration, in which external toothing with a plurality of parallel toothing planes, one above another, is formed at an end of a short connecting leg, and in which a receiving chamber is formed at an end of a long connecting leg, which receiving chamber has internal toothing having a plurality of parallel toothing planes, one above another, in which the external toothing of the short connecting leg engages, the connecting legs being connected to one another via a curved clasp; and
    wherein the receiving chamber in the long leg is widened by a cavity at least one of:
        a shortening of the short leg thereby lowering the end face of the external toothing of the short leg; and
        a cavity above an uppermost toothing plane of the internal toothing facing the clasp; and
    wherein the toothings at the pointed transitions between the tooth flanks and in the inner grooves are rounded with a radius of at least 3% of the nominal chain diameter.

8. The Kenter shackle as set forth in claim 7 wherein the cavity is formed by a pocket extending at least above the tooth flanks of the uppermost toothing plane.

9. The Kenter shackle as set forth in claim 7 wherein the toothings each comprise four toothing planes.

10. The Kenter shackle as in claim 7, wherein the toothings are formed as sawtooth toothings and are aligned with a loading flank transversely or at an obtuse angle to a longitudinal axis oriented parallel to the length of the Kenter shackle.

* * * * *